Dec. 5, 1961    F. LITTLEFORD    3,011,840

BEARING HOUSINGS FOR ALIGNED HIGH SPEED SHAFTS

Filed June 11, 1959

FRANK LITTLEFORD
INVENTOR

BY Richardson, David and Verdon
ATTORNEYS.

United States Patent Office 3,011,840
Patented Dec. 5, 1961

3,011,840
BEARING HOUSINGS FOR ALIGNED HIGH
SPEED SHAFTS
Frank Littleford, Brough, England, assignor to Blackburn
Engines Limited, Brough, England, a British company
Filed June 11, 1959, Ser. No. 819,695
Claims priority, application Great Britain June 23, 1958
3 Claims. (Cl. 308—184)

This invention relates to the bearings of co-axial shafts, particularly such shafts in single or multi-stage gas turbine engines.

The bearings at the adjacent ends of co-axial shafts must support and align them and it is difficult to provide a flexible or floating bearing for the one shaft to compensate for any small mis-alignment. It is also difficult to provide for adequate lubrication of such bearings.

It is therefore the object of the present invention to provide a bearing assembly giving the necessary fixed and flexible support to the ends of the respective shafts. It is a further object of the invention to provide adequate lubrication for the bearings of such assembly.

Thus according to the invention, two bearing housings are mounted coaxially as a single unit. One housing is made radially flexible by the provision of circumferentially spaced longitudinal slots all around the housing. The slots define flexible webs therebetween which are narrower than the slots. The assembly is mounted in a supporting structure or casing having at least three equidistant pads or equivalent surfaces limiting the flexing of the slotted housing.

Further according to the present invention, lubrication of the bearings is obtained by providing a tube extending lengthwise of the housings which receives lubricant from a bore in the supporting structure or casing and feeds it to rings supplying the bearings.

Figure 1:
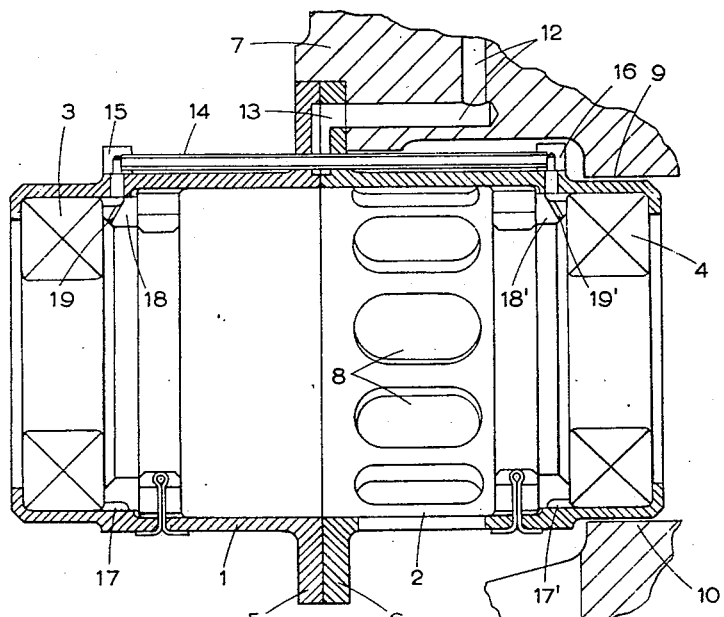
Figure 2:
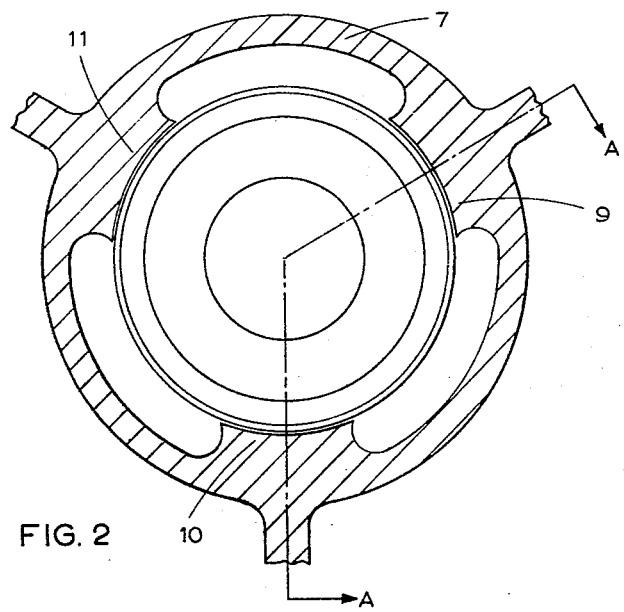

Now in order that the invention may be clearly understood and readily carried into effect an embodiment thereof is by way of example hereinafter more fully described with reference to the accompanying drawings, in which:

FIG. 1 is a sectional view taken on the line A—A of FIG. 2 which is a view looking on the right hand side of FIG. 1.

As illustrated in the drawings, two cylindrical bearing housings 1, 2 for supporting bearings 3, 4 respectively and having external peripheral flanges 5, 6 are thereby united coaxially as a single unit by spigotting together in a recess in a common support casing 7. The housing 1 is rigid and provides a fixed support for the bearing 3, while the housing 2 is made flexible by providing it with longitudinal slots 8 to allow the bearing 4 to float. The extent of flexing of the housing 2 is limited by forming the casing 7 with pads 9, 10, 11 which have ample clearance between them and the wall of the housing 2.

Lubrication of the bearings 3, 4 is obtained by providing bores 12 in the casing 7 and similar bores 13 in the flanges 5, 6 communicating therewith. A tube 14 extends lengthwise of the united housings 1, 2 to terminate in transfer blocks 15, 16 near the ends thereof. The tube 14 is apertured to receive lubricant from the bore 13 which passes in opposite directions through the tube to the blocks 15, 16 from whence the lubricant passes to annular chambers or channels 17, 17[1] formed by spacer rings 18, 18[1] and thence through jets 19, 19[1] onto the respective bearings.

The flexible bearing housing 2 allows the shaft supported by its bearing 4 to centralise itself and so adjust for any small mis-alignment of the two co-axial shafts (not shown) which may be journaled in the bearing. The shafts may be coupled for power transmission from the one to the other by known means such as external splines at the ends of the shafts meshing with internal splines in a tubular coupler inside the coaxial housings.

I claim:
1. A bearing support for two connected coaxial shafts, comprising a first cylindrical housing, a first shaft bearing mounted at one end of said housing, a second cylindrical housing axially aligned with and outside of the first cylindrical housing, a second shaft bearing mounted at one end of the second cylindrical housing, said second cylindrical housing having a plurality of circumferentially spaced longitudinal slots therein, said slots defining webs therebetween narrower than the slots and rendering said second cylindrical housing radially flexible, said other ends of the housings being disposed in face-to-face abutment so that the housings are axially aligned with each other, and a supporting structure engaging the abutted other ends of the housings, said structure having a cylindrical portion with circumferentially spaced inwardly projecting pads at said one end of the second cylindrical housing to limit flexing of the webs.

2. A bearing support for two connected coaxial shafts, comprising a first cylindrical housing, a first shaft bearing mounted at one end of said housing, a second cylindrical housing axially aligned with and outside of the first cylindrical housing, a second shaft bearing mounted at one end of the second cylindrical housing, said second cylindrical housing having a plurality of circumferentially spaced longitudinal slots therein, said slots defining webs therebetween narrower than the slots and rendering said second cylindrical housing radially flexible, flanges at the other ends of the housings being disposed in abutment so that the housings are axially aligned with each other, and a supporting structure engaging the abutted flanges, said structure having a cylindrical portion with circumferentially spaced inwardly projecting pads at said one end of the second cylindrical housing to limit flexing of the webs.

3. A bearing support for two connected coaxial shafts, comprising a first cylindrical housing, a first shaft bearing mounted at one end of said housing, a second cylindrical housing axially aligned with and outside of the first cylindrical housing, a second shaft bearing mounted at one end of the second cylindrical housing, said second cylindrical housing having a plurality of circumferentially spaced longitudinal slots therein, said slots defining webs therebetween narrower than the slots and rendering said second cylindrical housing radially flexible, other ends of the housings being disposed in abutment so that the housings are axially aligned with each other, and a supporting structure encompassing portions of the housings, said structure having at least three equiangular internal surfaces radially spaced from the second cylindrical housing and limiting flexing of the webs, each of said housings having a radially extending external annular flange at the other end thereof, the flanges of the housings being disposed in abutment and connected together, said structure having a first bore therein for passing lubricant therethrough, said flanges having a further bore communicating with the first bore for receiving lubricant therefrom, a tube passing through the joined flanges perpendicularly thereto and having a lateral opening communicating with the further bore, and spacer rings fitted in the housings adjacent to the bearings, said rings having channels formed therein communicating with ends of the tube for receiving lubricant therefrom and passing the lubricant to the bearings.

References Cited in the file of this patent

UNITED STATES PATENTS

| 421,089 | Wood | Feb. 11, 1890 |
| 2,922,278 | Szydlowski | Jan. 26, 1960 |

FOREIGN PATENTS

| 723,988 | Great Britain | Feb. 16, 1955 |